United States Patent [19]

Lord

[11] Patent Number: 4,545,210
[45] Date of Patent: Oct. 8, 1985

[54] ELECTRONIC PROGRAM CONTROL FOR A REFRIGERATION UNIT

[75] Inventor: Richard G. Lord, Liverpool, N.Y.

[73] Assignee: Carrier Corporation, Syracuse, N.Y.

[21] Appl. No.: 597,331

[22] Filed: Apr. 6, 1984

[51] Int. Cl.[4] .................. F25B 45/00; F25B 49/00
[52] U.S. Cl. ........................................ 62/77; 62/127;
62/231; 364/191
[58] Field of Search ............... 62/77, 127, 231;
165/12; 364/191, 557, 505, 496

[56] References Cited

U.S. PATENT DOCUMENTS 4,393,449 7/1983 Takeda et al. ................ 364/191 X
4,455,095 6/1984 Bleiker ........................... 364/557 X Primary Examiner—William E. Wayner
Attorney, Agent, or Firm—Robert H. Kelly

[57] ABSTRACT

Programmable headers with fixed jumpers are used at the input of a microprocessor to develop a binary code for use by the microprocessor to configure the microprocessor to the physical characteristics of an assembled refrigeration unit. The programmable header is programmed at the factory by selectively breaking the jumpers to develop the binary code. The programming of the microprocessor for accessory equipment can be performed by field service personnel by using small DIP switches to develop a binary code for the microprocessor.

2 Claims, 3 Drawing Figures

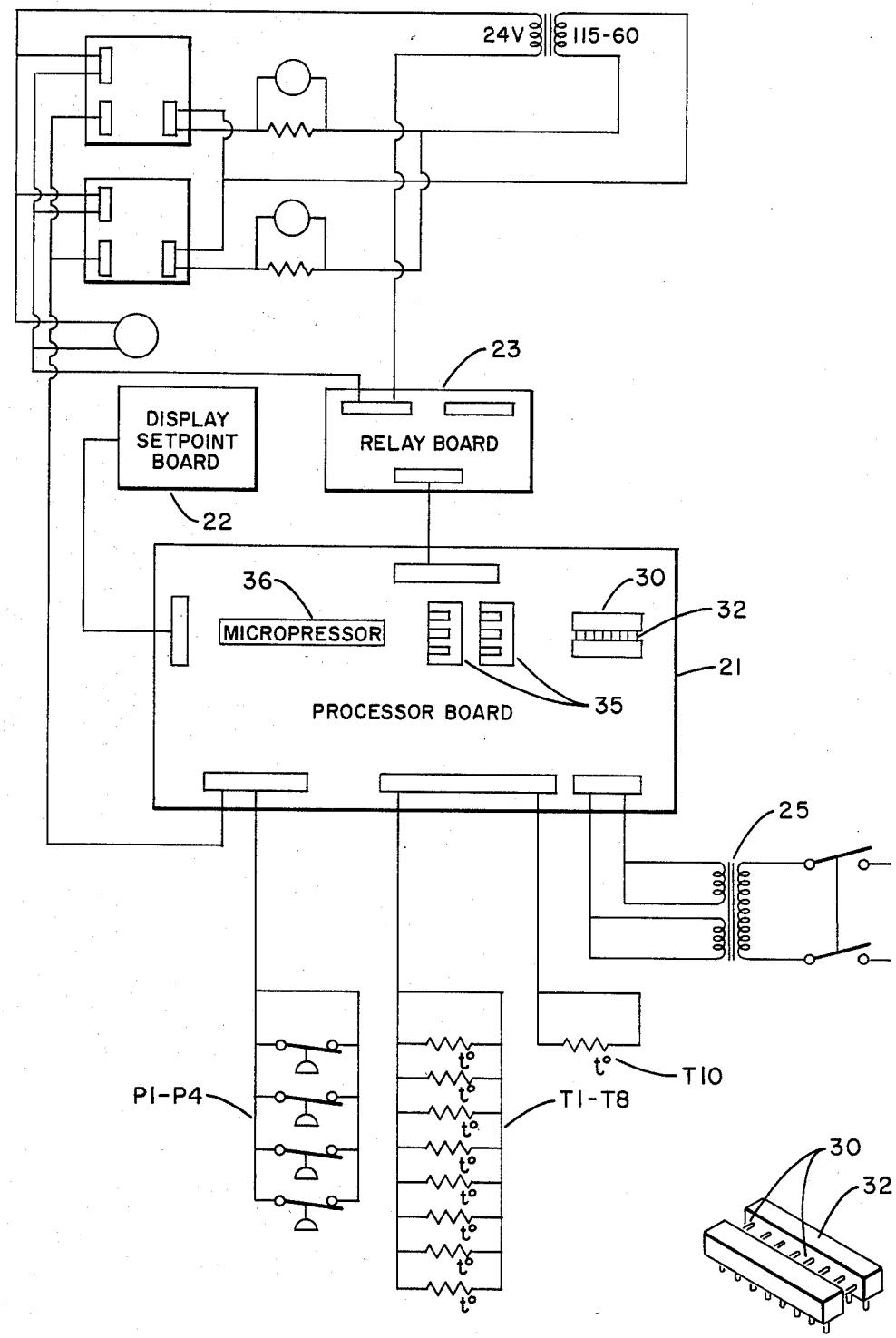

ELECTRONIC PROGRAM CONTROL FOR A REFRIGERATION UNIT

BACKGROUND OF THE INVENTION

This invention relates to refrigeration systems, and more specifically to a method and apparatus for improving the efficiency, reliability, and manufacturability of the electronic control system for an air conditioning unit.

Conventional refrigeration systems utilize a recirculating refrigerant for removing heat from a low temperature side of the refrigeration system and for discharging heat at a high temperature side of the refrigeration system. The work input necessary to operate the refrigeration system is provided by a motor driven compressor which receives low pressure gaseous refrigerant and compresses it to a high pressure. This high pressure gaseous refrigerant is supplied to a condenser where heat is removed from the gaseous refrigerant to condense it to a liquid. This liquid refrigerant is then supplied through an expansion valve to an evaporator wherein heat is transferred from a heat transfer fluid to the liquid refrigerant to evaporate the liquid refrigerant. The heat transfer fluid is thereby cooled and then used to cool a load, such as to cool a building. The evaporated refrigerant from the evaporator is returned to the compressor for recirculation through the refrigeration system. A control system directs the operation of the air conditioning unit.

The electronic control system is designed to replace the electromechanical control systems of air conditioning units. The system consists of several components: the processor board, relay board, set point board, accessory reset board, compressor protection board, control transformer, and thermistors. The processor board contains the microprocessor, power supplies, A/D converters, EXV drivers, relay drivers and display drivers. The control may use a microprocessor with an external eprom memory module or a masked version thereof.

The processor board is a generic board for use with air cooled chillers, water cooled chillers, condenserless chillers, or heat pump water to water chillers. A configuration header is used to program the control at the factory to tell the control what the physical characteristics of the particular unit are. The configuration header uses small wires that are selectively broken to configure the unit to the desired unit. The jumpers act as binary on/off switches and are used to determine the type of unit, the number of compressors, the type of expansion valve used, and the frequency of the electrical power system. The jumpers are actually located in a small header that can be removed from the board for setting the configuration. In the past the different unit configurations have been programmed into the control circuit through the control circuit wiring.

Field programmable options can be accomplished by the use of small DIP switch assemblies located on the board. The switches are generally protected by a plastic cover which must be removed before they can be changed in the field. The board also has a series of input thermistors and several switch inputs connected to it. Field adjustments of the switch set points are made through 10K ohm potentiometers.

Various outputs are controlled through relays on a relay board with a display of the outputs located on a display board. The expansion valve stepper motor, however, is controlled directly by an output from the processor board. To get the different loading sequences from the relays, the logic for controlling the relays has been stored in software and is selected by the unit configuration, compressor, and unloader jumpers. Various relays also control functions of either circuit No. 1 or circuit No. 2 compressors.

A display set point board is connected to the processor board through a ribbon cable and is used to communicate with the operator. Generally, the display set point board is located on the control/gauge panel. The board contains the leaving water set point potentiometer, a two digit display, and a display switch. Through the display, the controls show the stage of capacity, unit operation mode, and diagnostic information.

Most compressor safety controls today are initiated by flow switches which are troublesome to maintain and calibrate. Further, most refrigeration equipment uses the control circuit wiring to program the control circuit. The control wiring must be changed for each different unit manufactured. This rewiring involved a tremendous amount of time.

Ability to replace moving parts and flow switches in a control system and have a simple means to allow for the programming of a very sophisticated electronic control during the assembly of an air conditioning unit and in the field would represent a significant savings in the installation and maintenance of the unit. Thus, there exists a need for a method and apparatus which utilize electronic components to control and diagnose malfunctions in an air conditioning unit.

SUMMARY OF THE INVENTION

The present invention is directed to a method and apparatus for controlling a refrigeration system. An object of this invention is to permit easy programming of a very complicated electronic control, using one generic control board, that can be used on a large variety of units by using a programmable header to program the control for different unit types and options.

The control system consists of a processor board which contains a microprocessor that receives and stores information sent to it from other components in the system. A relay board, electrically connected to the processor board, controls the voltage circuits for the compressors and outdoor fan motors. Further, the control system has a compressor protection and control system to control and protect the compressor and a display/set point board with a digital display to communicate with the operator.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designating like or corresponding parts throughout the same.

FIG. 2 is a schematic representation of the electronic control circuit of the refrigeration system shown in FIG. 1; and FIG. 3 is an isometric view of a programmable header for use in the control circuit of FIG. 2.

DESCRIPTION OF THE PREFERRED EMBODIMENT

Figure 1:
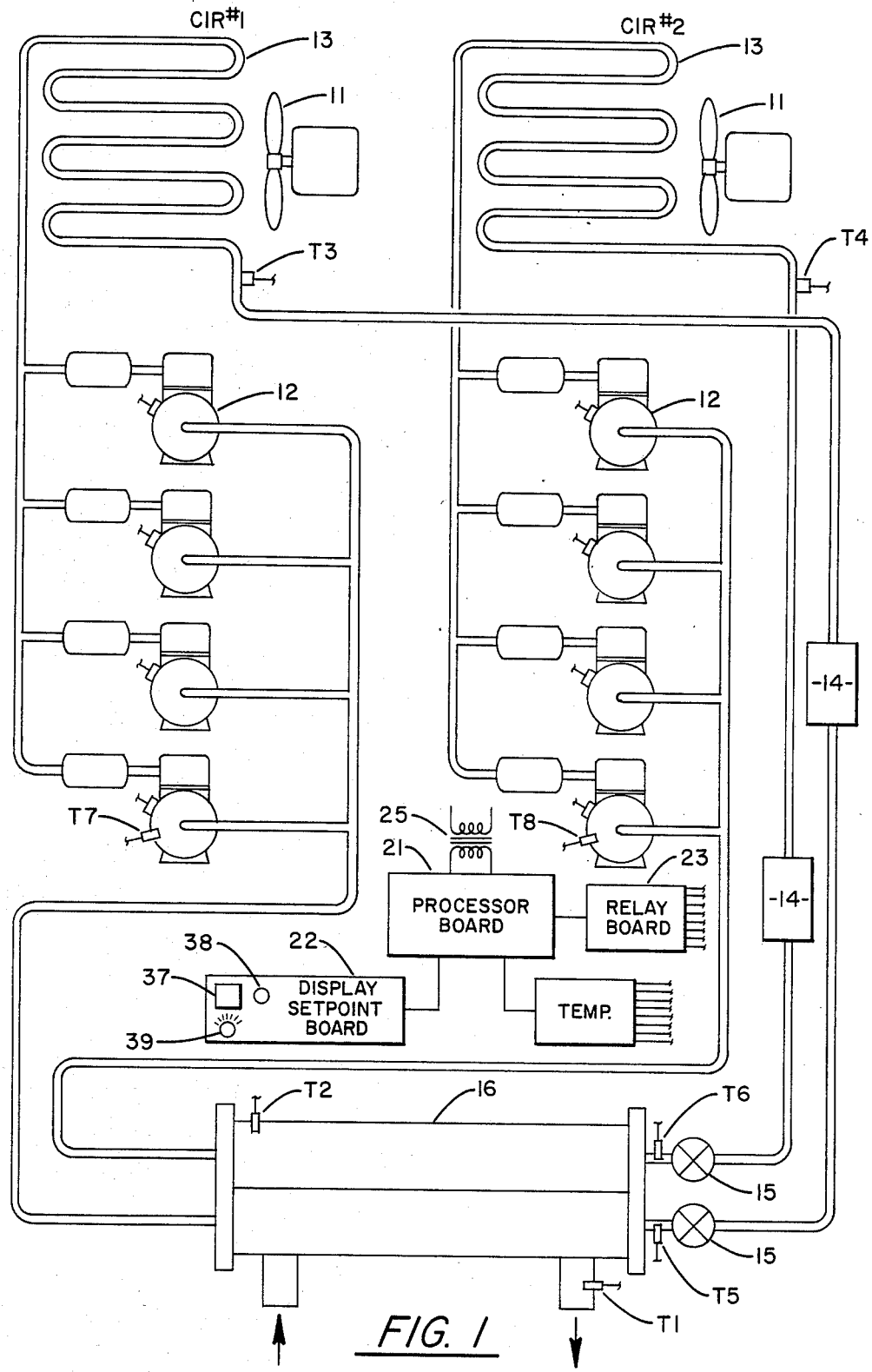
FIG. 1 is a schematic representation of a dual circuit refrigeration system with a control system for operating the refrigeration system.

The present invention relates to an electronic control system for a refrigeration system. As shown in FIG. 1, the refrigeration system comprises two circuits each having at least one compressor 12, an air-cooled condenser 13, (cooled by fan 11), a filter-dryer 14, and expansion valve 15, and a dual circuit cooler 16 connected in the usual manner. Also, as shown in FIG. 1, the control system comprises a processor board 21, a display/set point board 22, a relay board 23, and accessory reset board 24, control transformer 25 and a plurality of thermistors.

The processor board 21, as shown in FIG. 2, contains a microprocessor 36 and may contain various other electronic components, such as, a power supply, A/D converters, expansion valve drivers, relay drivers, and display drivers. The microprocessor may be any device or combination of devices, suitable for receiving input signals, for processing the received input signals according to preprogrammed procedures, and for generating control signals in response to the processed input signals. The control signals generated by the microprocessor are supplied to control devices which control the operation of the refrigeration system in response to the control signals provided to the control devices from the microprocessor. Preferably, the microprocessor is a model 8031 manufactured by Intel Corporation, having an external eprom memory module. A masked version of the model 8031, i.e. a model 8751 is also suitable.

The processor board 21 is a generic control board for use with various refrigeration systems. To determine the configuration of the processor board 21 to be used with a specific refrigeration system, a configuration header 30 is used to correlate the processor board 21 to the specific physical characteristics of the refrigeration unit. The configuration header 30 contains a plurality of small wires 32, e.g. eight jumpers, that are selectively broken to develope a binary code which sets the configuration of the processor board 21. The configuration header 30 is generally preprogrammed at the factory and shall configure the processor board 21 for the type of unit to be controlled.

In FIG. 2 the processor board 21 is shown with its various inputs and outputs for controlling the refrigeration unit.

The processor board may also contain a plurality of small DIP switch assemblies 35 intended to be used in the field to select the field programmable options. The options may include unloaders, brine temperature, chiller pulldown selection, and return water temperature reset. The DIP switches 35 are generally ON-OFF switches connecting various set point controls to field thermistors or resistance temperature detectors. All field adjustments, after the corresponding DIP switch is turned to the ON position are made through adjustable potentiometers. To be able to detect faulty potentiometers a valid potentiometer range of 10 to 90% of potentiometer travel has been established. If the potentiometer is outside the 10 to 95% range, then an alarm will be energized and the control will automatically transfer to its failsafe condition.

As shown in FIG. 3, the configuration header is a plug-in module containing eight small wires that are selectively broken to configure the processor board to the refrigeration unit. In operation the eight jumpers are used to determine the type of unit (i.e. air cooled chiller, water cooled chiller, and heat machine), the number of compressors, the type of expansion valve used, and whether 50 or 60 hertz is used in operation.

Further, as shown in FIG. 2, the processor board 21 is electrically connected through electrical connectors to various inputs and outputs. Pressure signals indicative of various sensed pressures are supplied to the processor board. Further, temperature signals indicative of sensed temperatures are supplied by way of electrical lines. The various input thermistors and their locations are as follows:

| THERMISTOR NAME | INPUT THERMISTORS FUNCTION | LOCATION |
|---|---|---|
| T1 | LEAVING COOLER WATER | LEAVING WATER NOZZLE |
| T2 | ENTERING COOLER WATER | ENTERING WATER BAFFLE SPACE |
| T3 | SATURATED CONDENSING TEMP. CIR. 1 | RETURN BEND OF LAG COIL |
| T4 | SATURATED CONDENSING TEMP. CIR. 2 | RETURN BEND OF LAG COIL |
| T5 | COOLER SATURATED SUCTION TEMP. CIR. 1 | COOLER HEAD NEAR LIQUID NOZZLE |
| T6 | COOLER SATURATED SUCTION TEMP. CIR. 2 | COOLER HEAD NEAR LIQUID NOZZLE |
| T7 | SUPERHEAT GAS ENTERING PISTON CIR. 1 | LEAD COMP. CIR. 1 |
| T8 | SUPERHEATED GAS ENTERING PISTON CIR. 2 | LEAD COMP. CIR. 2 |
| T10 | RESET TEMPERATURE | OUTSIDE AIR OR BUILDING INSIDE AIR TEMPERATURE |

The processor board 21 uses the temperature readings to control capacity, fan cycling, and the electronic expansion valve.

Preferably, the temperature sensors are two different types. The first type is used to sense saturated condensing temperature (T3–T4) and is attached to a return bend of a condenser coil. The second type of temperature sensors are probes used to sense refrigeration temperature (T5–T8) and water temperature (T1–T2). The probe assembly is inserted directly into the refrigerant circuit or water loop and secured there by normal means. The saturated temperature sensor, however, is generally clamped to the outside of a return bend on the coil.

A relay board 23 receives signals from the processor board 21 and connects output relays to the compressors and unloaders in order to define the loading and unloading sequence of the compressors. The sequences to be used to load and unload the compressors are programmed into the microprocessor on the processor board. Generally, one-half of the relays will be used to control the circuit number 1 compressors and unloader while the other half of the relays are used to control circuit number 2 compressors and unloader. Two basic chiller compressor loading sequences are defined in order to allow for lead-lag control of the compressors. Lead-lag is used to equalize the run time on the compressors. The lead-lag control sequence shall automatically be selected by the software. The sequence is randomly determined after the unit is turned on and is changed whenever the unit becomes fully loaded or fully unloaded.

The display/set point board 22 is generally connected to the processor board 21 through a ribbon cable. Preferably, the board contains a digital display 37, a display switch 38 for energizing the digital display, and a set point potentiometer 39 for adjusting the leaving water temperature set point. Further, the display switch 38 is used in conjunction with the LED display to show the stage of capacity, control system status, and diagnostic information. The diagnostic information is generally displayed on the two digit LED display in numbered codes. Accordingly, the diagnostic information including either operating status information or overload information will automatically be displayed on the LED. The display will rotate every two seconds and overload information will take priority over all other codes.

Through the programmable header and DIP switches it is possible to manufacure a single processor board with one software package that could be used for thousands of different refrigeration unit configurations.

A configuration header utilized to successfully preprogram a refrigeration unit is as follows:

| JUMPER # | FUNCTION |
| --- | --- |
| 1 | Type Unit |
| 2 | Type Unit |
| 3 | # Compressors |
| 4 | # Compressors |
| 5 | # Compressors |
| 6 | TXV Select |
| 7 | 50/60 HZ |
| 8 | Not Used (Future Use) |

The type of unit was determined by using jumpers 1 and 2 as follows:

| TYPE UNIT | JUMPER 1 | JUMPER 2 |
| --- | --- | --- |
| Air Cooled Chiller | 0 | 0 |
| Water Cooled Chiller | 1 | 0 |
| Heat Machine | 1 | 1 |
| Illegal | 0 | 1 |

1 = Jumper in place (closed)
0 = Jumper removed (open)

The number of compressors was determined by using jumpers 3, 4 and 5.

| # COMP. | JUMPER 3 | JUMPER 4 | JUMPER 5 |
| --- | --- | --- | --- |
| 2 | 1 | 0 | 0 |
| 3 | 0 | 1 | 0 |
| 4 | 1 | 1 | 0 |
| 5 | 0 | 0 | 1 |
| 6 | 1 | 0 | 1 |
| 7 | 0 | 1 | 1 |
| 8 | 1 | 1 | 1 |
| Illegal | 0 | 0 | 0 |

Jumper 6 was used to select what kind of expansion valve was used.
0 = Mechanical EXV
1 = Electronic EXV
Jumper 7 was used to select 50 or 60 HZ operation.
0 = 60 HZ
1 = 50 HZ
It should be noted that the foregoing description shall configure the control system for the unit type to be controlled.

What is claimed is:

1. A method of programming the electronic processor control board of a refrigeration unit at the final assembly of the unit which comprises:
   determining the physical characteristics of the refrigeration unit;
   arranging a configuration header having a plurality of conducting wires therethrough on the processor control board;
   assigning each of said plurality of conducting wires to a preselected input of a microprocessor;
   electrically connecting the assigned conducting wire to an input of a microprocessor; and
   selectively developing a binary code for each input of the microprocessor by allowing or not allowing a signal through each conducting wire to be impressed on the input of the microprocessor to program the microprocessor to the determined physical characteristics of the refrigeration unit.

2. A method as set forth in claim 1 further comprising the steps of:
   electrically connecting at least one switch means to said microprocessor for each optional accessory added to the refrigeration unit whereby the switch means is set after final assembly of the unit to develop a binary code for the optional accessory.

* * * * *